Dec. 4, 1951  E. C. HORTON  2,577,125

WINDSHIELD WIPER

Filed July 16, 1946

INVENTOR.
Erwin C. Horton
BY
Bean, Brooks, Buckley & Bean.
ATTORNEYS

Patented Dec. 4, 1951

2,577,125

UNITED STATES PATENT OFFICE 2,577,125

WINDSHIELD WIPER

Erwin C. Horton, Hamburg, N. Y., assignor to Trico Products Corporation, Buffalo, N. Y.

Application July 16, 1946, Serial No. 683,864

4 Claims. (Cl. 15—253)

This invention relates to the windshield cleaning art and is an improvement on the copending application of John R. Oishei filed August 21, 1944, Serial No. 550,327, now Patent 2,572,750, October 23, 1951. In such copending application there is disclosed a pair of wiper actuating shafts connected to an oscillatory drive shaft by an endless flexible transmission suitably guided over supporting pulleys.

The object of the present invention is to provide a windshield cleaner of this general arrangement and type wherein the flexible transmission is given reciprocable motion in a unique manner. More particularly, the reciprocatory motion is imparted by means of a motion converting mechanism interposed between the transmission and a continuously rotating drive.

The invention further has for its object to provide a simplified windshield cleaner mechanism of durable design and one which will provide for back and forth wiper movement in a practical manner.

The foregoing and other objects will manifest themselves as the following description progresses, reference being made therein to the accompanying drawing, wherein.

Figure 1:
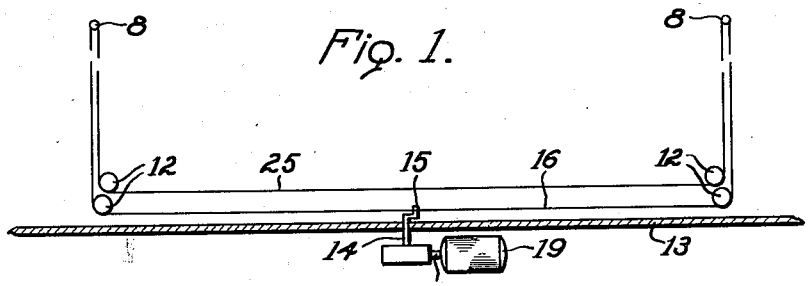
Fig. 1 is a diagrammatic view illustrating the simplified arrangement of the present invention.
Figures 2, 3:
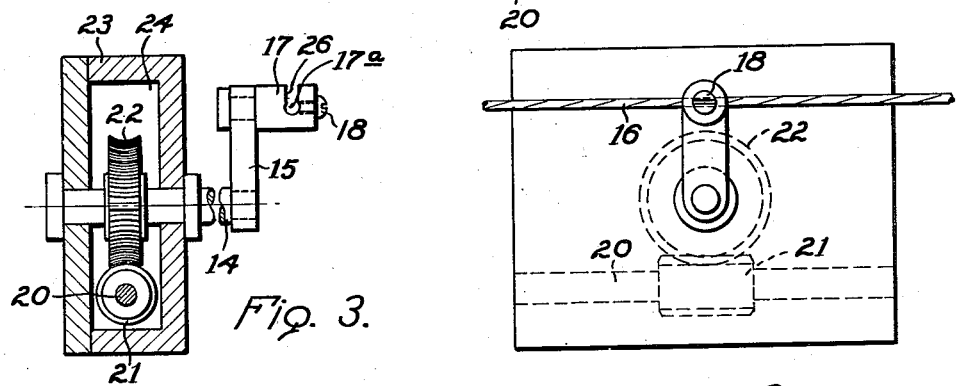
Fig. 2 is an elevation of the motion converter.
Fig. 3 is a cross sectional view through the converter.
Figure 4:
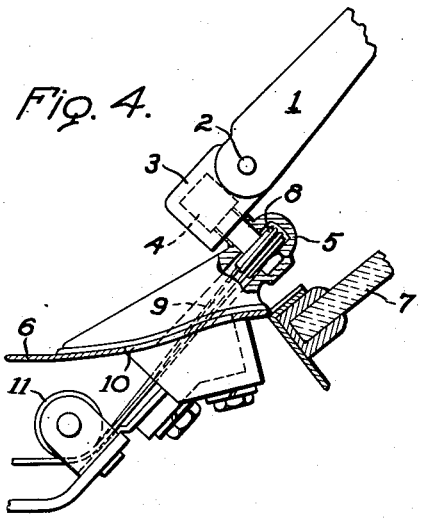
Fig. 4 is a fragmentary illustration depicting more particularly the cowl for the windshield wiper actuating arm.
Figure 5:
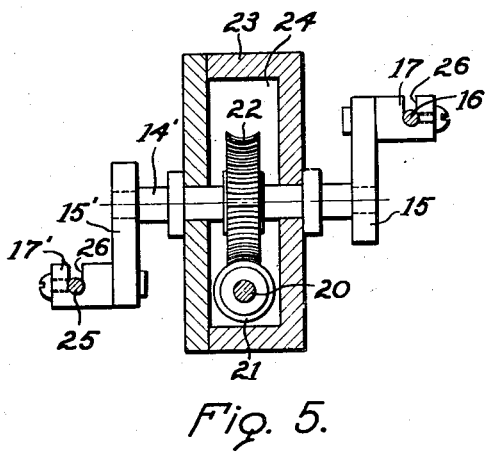
Fig. 5 is a cross sectional view through a modified form of motion converter.

Referring more particularly to the drawings, the numeral 1 designates an actuating arm for the wiping blade of a windshield cleaner, the arm being pivotally mounted at 2 on a mounting section 3 which is fixed on the oscillatory shaft 4 finding journal support in a housing 5. The housing is disposed on the cowl 6 at the base of the windshield 7 and embodies a drum 8 about which takes an endless cable 9, the cable reaches passing downwardly through an opening 10 in the cowl and under guide pulleys 11 and 12. The guide pulleys 12 are suitably mounted on the passenger's side of a fire wall 13 and at opposite sides of a drive shaft 14 which has a crank part 15 connected to one of the reaches 16 of the endless transmission cable. The crank part 15 is provided at its outer end with a rotatably mounted bracket 17 which has an opening 17a through which the reach portion 16 extends, the latter being fixed by a set screw 18. From the foregoing it will be apparent that as the shaft 14 and its crank 15 rotate continuously in one direction, the reach 16 will be reciprocated back and forth. In this connection it will be observed that the pulleys 12 are spaced a considerable distance on opposite sides of the crank shaft 14, which fact will permit the crank to rotate without subjecting the cable to undue strain or tension.

The crank shaft 14 may be rotated continuously in one direction by suitable means, such as an electric motor 19 which is mounted on the engine or outer side of the fire wall and has its shaft 20 provided with a worm 21 that is in meshing relation with a worm gear 22 fixed to the crank shaft. This worm transmission may be suitably enclosed in a dust proof housing 23 which has a chamber 24 for holding a bath of lubricant in which the worm and worm gear will operate.

The continuous rotation of the crank shaft 14 will therefore impart rhythmic reciprocatory motion to the endless transmission cable so as to effect oscillation of the wiper actuating shaft 4 and its arm 1.

If desired, the shaft may be extended, as at 14', through the opposite side of the housing 23 to mount a second crank 15' which in turn is provided with a bracket or clamp 17' for engaging the companion reach 25 of the endless cable. Thus constructed, the two crank arms 15 and 15' will be connected to the opposite sides of the endless transmission cable and will concurrently pull upon such opposite side portions of the cable as the crank shaft continues to rotate. In this embodiment the motor may be mounted on the inner side of the fire wall, or one cable flight may be disposed on the opposite side of the wall from the other. The two cable flights 16 and 25 will be tied together by the crank shaft at a point intermediate the pairs of supporting pulleys 12. This modified arrangement will reduce to a minimum any stretching of the cable and will maintain the wiper motion free of substantial back lash or lost motion.

To facilitate the installation the bracket or clamp 17 (17') may be provided with a laterally extending entranceway 26 leading to the cable receiving opening 17a. This will enable the motion converting unit 20—24 being placed or removed without disturbing the pulley mounted flexible transmission, and vice versa.

The foregoing description has been given in detail for clarity and ease of understanding the inventive concept which may obviously be incorporated in other physical embodiments without departing from the spirit of the invention and the scope of the appended claims.

What is claimed is:

1. A windshield cleaner comprising spaced wiper shafts, an endless cable operatively connecting the two shafts for oscillating the same, said endless cable having opposite side portions placed in adjacency, and a continuously rotating crank shaft having spaced cranks each connected with a respective side portion of the cable to pull such two side portions simultaneously but in opposite directions.

2. In a motor vehicle construction having a windshield and an underlying fire wall separating the engine compartment from the passenger compartment, spaced windshield cleaner mechanisms each including a wiper actuating shaft journaled adjacent the windshield, a driving crank shaft journaled adjacent the fire wall and having a crank part revolving continuously about the crank shaft axis and formed with a cable receiving seat, a flexible power transmitting cable operatively connected to the wiper shafts and having a part stretched between the latter and received by the seat of the crank shaft for oscillating the two connected wipers, cable supporting means arranged on the fire wall between the crank shaft and each wiper shaft to support and guide the stretched cable part as it is actuated by the crank shaft, and means detachably securing the stretched cable part to the seat whereby the crank shaft may be removably placed in its operative position adjacent the fire wall while maintaining a fixed relation between the cable connected wipers.

3. In a motor vehicle construction having a windshield and an underlying fire wall separating the engine compartment from the passenger compartment, spaced windshield cleaner mechanisms each including a wiper actuating shaft journaled adjacent the windshield, a driving crank shaft journaled adjacent the fire wall and having spaced crank parts revolving continuously about the crank shaft axis and each formed with a cable receiving seat, an endless flexible power transmitting cable operatively connected to the wiper shafts and having spaced parts stretched between the latter and received by the seats of the crank shaft for oscillating the two connected wipers, cable supporting means arranged on the fire wall between the crank shaft and each wiper shaft to support and guide the stretched cable parts as it is actuated by the crank shaft, and means detachably securing the stretched cable parts to the seat whereby the crank shaft may be removably placed in its operative position adjacent the fire wall while maintaining a fixed relation between the cable connected wipers.

4. In a motor vehicle construction having a windshield and an underlying fire wall separating the engine compartment from the passenger compartment, spaced windshield cleaner mechanisms each including a wiper actuating shaft journaled adjacent the windshield, a driving crank shaft journaled adjacent the fire wall and having a crank part revolving continuously about the crank shaft axis and formed with a cable receiving seat, flexible power transmitting cable means operatively connecting the wiper shafts and having spaced parts stretched between the latter with one cable part being received by the seat of the crank shaft for oscillating the two connected wipers, cable supporting means arranged on the fire wall between the crank shaft and each wiper shaft to support and guide the stretched cable parts and to enable said one cable part flexing laterally back and forth in accommodation of the rotating crank part as actuated by the crank shaft, and means detachably securing the stretched cable parts to the seat whereby the crank shaft may be removably placed in its operative position adjacent the fire wall while maintaining a fixed relation between the cable connected wipers.

ERWIN C. HORTON.

REFERENCES CITED

The following references are of record in the file of this patent:

UNITED STATES PATENTS

| Number | Name | Date |
|---|---|---|
| 1,491,834 | Van Loozen | Apr. 29, 1924 |
| 2,172,488 | Waters | Sept. 12, 1939 |

FOREIGN PATENTS

| Number | Country | Date |
|---|---|---|
| 408,318 | Great Britain | Apr. 10, 1934 |
| 493,243 | Great Britain | Oct. 5, 1938 |